(12) United States Patent
Cinquemani et al.

(10) Patent No.: US 10,988,861 B2
(45) Date of Patent: Apr. 27, 2021

(54) APPARATUS FOR MAKING A SPUNBOND WEB FROM FILAMENTS

(71) Applicants: Claudio Cinquemani, Cologne (DE); Detlef Frey, Niederkassel (DE); Hans-Georg Geus, Niederkassel (DE); Peter Schlag, Troisdorf (DE)

(72) Inventors: Claudio Cinquemani, Cologne (DE); Detlef Frey, Niederkassel (DE); Hans-Georg Geus, Niederkassel (DE); Peter Schlag, Troisdorf (DE)

(73) Assignee: REFENHAEUSER GMBH & CO. KG MASCHINENFABRIK, Troisdorf (DE)

( * ) Notice: Subject to any disclaimer, the term of this patent is extended or adjusted under 35 U.S.C. 154(b) by 0 days.

(21) Appl. No.: 16/542,844

(22) Filed: Aug. 16, 2019

(65) Prior Publication Data

US 2019/0376208 A1 Dec. 12, 2019

Related U.S. Application Data

(62) Division of application No. 14/758,968, filed on Aug. 27, 2015, now Pat. No. 10,428,443.

(51) Int. Cl.
*D01D 5/088* (2006.01)
*B29C 48/05* (2019.01)
(Continued)

(52) U.S. Cl.
CPC .......... *D01D 5/088* (2013.01); *D01D 5/0985* (2013.01); *D01D 7/00* (2013.01); *D01F 6/06* (2013.01);
(Continued)

(58) Field of Classification Search
None
See application file for complete search history.

(56) References Cited

U.S. PATENT DOCUMENTS 3,737,508 A * 6/1973 Weir .................. D01D 4/02
264/204
8,057,205 B2 * 11/2011 Hisada .................. D01D 5/098
425/66
(Continued)

*Primary Examiner* — Benjamin A Schiffman
(74) *Attorney, Agent, or Firm* — Andrew Wilford

(57) ABSTRACT

An apparatus for continuously making a spunbond web of filaments comprises a spinneret, a cooling chamber into which process air for can be introduced for the purpose of cooling the filaments, a monomer suction device between a spinneret and cooling chamber, a stretcher and a deposition device for depositing the filaments of the spunbond web. The cooling chamber is divided into two cooling compartments, and process air can be suctioned out from a first upper cooling compartment at a volumetric flow rate ($V_M$) to a monomer suction device. Process air exits from the first upper cooling compartment at a volumetric flow rate ($V_1$) into a second lower cooling compartment and from the first upper cooling compartment at a volumetric flow rate ($V_1$) into a second lower cooling compartment. A ratio ($V_M/V_1$) is 0.1 to 0.35.

7 Claims, 2 Drawing Sheets

(51) Int. Cl.
*D01F 6/06* (2006.01)
*D01D 7/00* (2006.01)
*D04H 3/005* (2012.01)
*D01D 5/098* (2006.01)
*D04H 3/16* (2006.01)
*B29L 31/00* (2006.01)
*B29D 99/00* (2010.01)

(52) U.S. Cl.
CPC ............... *D04H 3/005* (2013.01); *D04H 3/16* (2013.01); *B29C 48/05* (2019.02); *B29D 99/0078* (2013.01); *B29L 2031/731* (2013.01)

(56) References Cited

U.S. PATENT DOCUMENTS

| 8,303,287 | B2* | 11/2012 | Peng | D04H 3/037 |
| | | | | 425/66 |
| 2003/0178742 | A1* | 9/2003 | Geus | D01D 5/088 |
| | | | | 264/211.22 |

\* cited by examiner

APPARATUS FOR MAKING A SPUNBOND WEB FROM FILAMENTS

CROSS REFERENCE TO RELATED APPLICATIONS

This application is a division of U.S. patent application Ser. No. 14/758,968 filed 2 Jul. 2018 as the US-national stage of PCT application PCT/EP2013/074594 filed 25 Nov. 2013 and claiming the priority of European patent application 12195239.4 itself filed 3 Dec. 2013.

FIELD OF THE INVENTION

The invention relates to an apparatus for making a spunbond web from filaments with spinneret, cooling chamber, stretcher and a deposition device for deposition of the filaments for the spunbond web. The invention furthermore relates to a apparatus for making a spunbond web from filaments. The scope of the invention also includes the manufacture of a spunbond line via the so-called spunbond method by the apparatus of the invention. The filaments preferably consist of a thermoplastic resin, preferably of polypropylene, and more preferably of a specially modified polypropylene. Incidentally, filaments means continuous fibers or continuous filaments, which considerably differ from the much shorter staple fibers.

BACKGROUND OF THE INVENTION

Apparatuses of the above-described type are known in various embodiments from practice or from the state of the art technology. Reference can be made, for example, to EP 1 340 843 A1. In many known apparatuses, the strength of the spunbond web is poor and especially the transverse strength of the spunbond web transversely to the direction of the machine or transversely to the transport direction. Another problem is the diameter inhomogeneities in the deposited filaments. These are small plastic assemblies that negatively affect the homogeneity of the spunbond web. Furthermore, it is often difficult to produce filaments with high fineness or with low titres within the framework of the known measures.

OBJECT OF THE INVENTION

In contrast, the object of the invention is to provide an apparatus of the aforementioned type with which the disadvantages described above can be avoided in an effective and functionally safe manner.

Further, another object of the invention is to provide a corresponding apparatus for making a spunbond web.

SUMMARY OF THE INVENTION

According to the invention, an apparatus for the continuous production of a spunbond web of filaments comprises a spinneret, a cooling chamber into which the process air for can be introduced for the purpose of cooling the filaments, a monomer suction device arranged between a spinneret and cooling chamber, a stretcher and a deposition device for depositing the filaments of the spunbond web, whereby the cooling chamber is divided into two cooling compartments, whereby process air can be suctioned out from a first upper cooling compartment at a volumetric flow rate ($V_M$) to a monomer suction device, whereby process air exits from the first upper cooling compartment at a volumetric flow rate ($V_1$) into a second lower cooling compartment and whereby the volumetric flow-rate ratio ($V_M/V_1$) is 0.1 to 0.35, preferably 0.12 to 0.25. Particularly preferred is a volumetric flow-rate ratio ($V_M/V_1$) of 0.15 to 0.2. Advantageously, the volumetric flow rate is measured in m$^3$/s. Incidentally, the term 'process air' particularly describes cooling air for cooling of the filaments. Preferably, the filaments are stretched aerodynamically using the stretcher.

It is within the scope of the invention that the filaments are manufactured from a thermoplastic material. It is recommended that the thermoplastic material is a polypropylene or a specially modified polypropylene (further explained below). An especially preferred embodiment of the invention is characterized in that the filaments are produced as mono component filaments.

In principle, bi-component or multi-component filaments could also be produced with the apparatus, according to the invention.

The cooling chamber is appropriately arranged at a spacing from the spinneret or from the nozzle plate of the spinneret. As set out below, the spacing between the spinneret or the nozzle plate and the cooling chamber is adjustable according to a particularly preferred embodiment of the invention. According to the invention, a monomer suction device is arranged between the spinneret and the cooling chamber. The monomer suction device suctions air out from the filament development area directly below the spinneret or the nozzle plate, whereby the gases escaping next to the polymer filaments, such as monomers, oligomers, decomposition products and the like can be removed from the system. Advantageously, the monomer suction device has a suction chamber to which preferably at least one suction fan is connected. It is recommended that the suction chamber has at least one suction duct towards the filament development area. The aforementioned gases or air are preferably suctioned out from the filament development area via this one suction duct. The invention is based on the discovery that process air is also suctioned out from the first upper cooling compartment via the monomer suction device, namely with a volumetric flow rate $V_M$. The invention also underlies the findings that a spunbond web can be produced with particularly advantageous properties, if the volumetric flow-rate ratio $V_M/V_1$ is adjusted as claimed or as described. The advantages achieved are particularly distinct, if the special polypropylene for making the filaments or for making the spunbond web is used according to a highly recommended embodiment of the invention, as further described below.

It is within the scope of the invention, that the cooling chamber is arranged next to an air supply chamber that is divided into at least two compartments, whereby process air can be introduced from a first upper compartment into the first upper cooling compartment and whereby process air can be introduced from a second lower compartment into the second lower cooling compartment. It is also within the scope of the invention that the process air can be introduced into the first upper cooling chamber portion, on the one hand, and can be introduced into the second lower cooling chamber portion with different volumetric flow rates, on the other hand. At least two vertically stacked cooling chamber portions are appropriately provided below the spinneret in which the filaments are subjected to process air. Preferably, only two cooling chamber portions are arranged vertically, one above the other. Upon exiting the spinning nozzle openings of the spinneret, the filaments are initially guided past the monomer suction device and then first pass through the first upper cooling chamber portion and then through the second lower cooling chamber portion.

A recommended embodiment of the invention is characterized in that process air with a volumetric flow rate $V_2$ is pulled the second lower cooling chamber portion and that the volumetric flow-rate ratio of the volumetric flow rate $V_1$ exiting from the first upper cooling chamber portion to the volumetric flow rate $V_2$ exiting from the second lower cooling chamber portion ($V_1/V_2$) is 0 to 0.5, preferably 0.05 to 0.5 and especially preferably 0.1 to 0.45. It is within the scope of the invention that the filaments exiting the second lower cooling chamber portion or process air exiting the second lower cooling chamber portion are introduced into the stretcher. A preferred embodiment of the invention is characterized in that process air exits from the first upper cooling chamber portion at a rate $V_1$ into the second lower cooling chamber portion, that process air exits from the second lower cooling chamber portion exits at a rate ($V_2$) and that the velocity ratio $V_1/V_2$ is 0.2 to 0.5, preferably 0.25 to 0.5 and preferably 0.3 to 0.5. According to a proven embodiment variant, the velocity ratio is $V_1/V_2$ 0.35 to 0.45 and in particular, for example, 0.4.

It is within the scope of the invention that an intermediate passage is arranged between the cooling chamber and the stretcher, which intermediate passage converges in a wedge shape from the exit of the cooling chamber to the entrance in an under-passage of the stretcher in a vertical portion. The intermediate passage appropriately converges in a wedge shape at the entrance of the under-passage in the vertical portion at the inlet width of the under-passage.

According to a proven embodiment of the invention, no air supply from outside is provided in the area of the cooling chamber and in the transition area between the cooling chamber and the stretcher, apart from the supply of process air in the cooling chamber. In this regard, it is within the scope of the invention to work with a so-called closed system. Preferably in the area of the cooling chamber, in the area of the intermediate passage and in the area of the stretcher no air supply from outside is provided, except for the supply of the process air in the cooling chamber.

It is recommended that at least one diffuser is arranged between the stretcher and the deposition device. Advantageously, such a diffuser features a diverging portion oriented towards the deposition device or a portion with diverging sidewalls. This results in functionally reliable deposition of the filaments to facilitate a random web. Incidentally, this is preferably an endlessly revolving conveyor belt on the deposition device. The filaments are deposited on this conveyor belt for the spunbond web and this web is then advantageously compacted and/or solidified. The solidification can in particular take place in a calender.

An especially preferred embodiment of the invention is characterized in that the nozzle bores of the spinneret are arranged distributed homogeneously throughout or over the entire nozzle plate. It is within the scope of the invention, that the spacings of the nozzle bores in the center of the spinneret are the same as in the outer areas of the spinneret. It is recommended that all nozzle bores arranged on a straight line or on an imaginary straight line are equally spaced from one another. Such a symmetrical distribution of the nozzle bores has especially proven itself to be the solution to the technical problem of the invention. As already mentioned above, the spacing of the spinneret or the spacing of the nozzle plate to the cooling chamber can be adjusted or varied according to the recommended embodiment of the invention. For this, the vertical height of the spinneret is appropriately adjustable.

For the solution of the technical problem, the invention also teaches a method for the continuous production of a spunbond web of filaments of thermoplastic material, wherein the filaments are spun using a spinneret and are introduced to a monomer suction device in a cooling chamber, whereby the filaments in the cooling chamber are cooled with process air, whereby the cooling chamber is divided into two cooling chamber portions, whereby process air is suctioned out from a first upper cooling chamber portion with a volumetric flow rate $V_M$ to the monomer suction device, whereby process air is introduced from the first upper cooling chamber portion with a volumetric flow rate $V_1$ in a second lower cooling chamber portion, whereby the volumetric flow-rate ratio $V_M/V_1$ is 0.1 to 0.3, preferably 0.12 to 0.25, whereby the filaments are introduced after exiting the cooling chamber into a stretcher and whereby the filaments are then placed on a storage deposition for the spunbond web.

As set out above, a polypropylene is preferably used as a thermoplastic material. Thus, the filaments produced according to the invention are made of polypropylene or are primarily made of polypropylene. Advantageously, the polypropylene is a homopolymer or a copolymer. Preferably, the polypropylene has a melting flow rate (MFR) of, for example, 10 dg/min to 40 dg/min, preferably from 10 dg/min to 25 dg/min and especially preferably from 10 dg/min to 21.5 dg/min. It is within the scope of the invention that the melting flow rate is measured according to the ASTM D1238 (2.16 kg, 230° C.) standard. The MFR is specified in grams (g) of polymer per 10 minutes (min) or the equivalent in decigrams (dg) of polymer per minute (min).

It is recommended that a quotient $R_2$ from the dimensionless stress ratio (Stress Ratio, SR) to the loss tangent (Loss Tangent, tan ?) is preferably between 0.6 and 30, preferably between 1.5 and 30 and especially preferably between 1.5 and 28. $R_2$ is preferably the quotient of the term (SR (500 s−1) $\eta_o$)·1/248 and the term (tan δ (0.1 rad/s)).

Appropriately, the value ($R_2$) is implemented by examining the oscillatory shearing with low angles (SAOS) at 190° C., wherein a 25 mm cone with an angle of one degree is used on a plate configuration of a rheometer (e.g. MCR 301 of Anton Paar GmbH). The test discs within the scope of the invention have a diameter of 25 mm and a thickness of 1 mm and are preferably obtainable by pressing a pellet sample at 190° C. for one minute without pressure and 1.5 minutes under a pressure of preferably 50 bars and then cooled for 5 minutes between water cooled plates. By storing at 190° C. for 13 minutes, thermal and/or crystalline information is deleted in the sample. Preferably, an angular velocity range or an angular frequency range of 500 rad/s to 0.0232 rad/s with 6 measurement points per 10 rad and a stress value of 10%, which stress value lies in the linear viscoelasticity region, which viscoelasticity region can be determined by a stress test. All experiments are carried out within the scope of the invention in a nitrogen atmosphere to avoid decomposition of the sample during measurement.

It is within the scope of the invention that a zero shear rate ($\eta_o$) is defined by a frequency-dependent memory share (G'), a frequency-dependent loss percentage (G") and a discrete relaxation spectrum method, which method is based on a linear regression, defined as:

$$\eta_0 = \sum_{u=1}^{M} \lambda_j G_j$$

where M is the number of discrete relaxation values, which depends on the value range of the experimental angular velocities or angular frequencies. $\lambda_j$ is the discrete relaxation time of the discrete spectrum and $G_j$ is the corresponding shear module.

In the case of compositions in which the terminal zone (i.e., G' is proportional to the square of the angular velocity ?2 and G" is proportional to the angular velocity) has not yet been reached in the frequency range of the experiment, so that the complex viscosity $|\eta^*|$ has not yet achieved a plateau value, $\eta_o$ should be determined by melting creepage experiments. From a quotient of the loss percentage G" and the memory share G', the loss tangent (Loss Tangent, tan δ) can be calculated according to the following formula:

$$\tan \delta = G''/G'$$

The loss tangent is a measure of the melt elasticity and relates to the molecular properties of the composition (e.g. the chain length distribution, the density of the molecular entanglement, etc.). Within the scope of the invention, the first normal stress difference ($N_1$) at a constant shearing with a constant shear rate (γ) is a function of the dynamic module G' and G" according to the formula:

$$N_1(\dot{\gamma}) = 2G' \left[ 1 + \left( \frac{G'}{G''} \right)^2 \right]^{0.7} \text{ for } \omega = \dot{\gamma}$$

G' and G" both refer to the angular frequency ($\omega^2$), wherein the temperature for the low angle oscillatory shearing (SAOS) and the attempts at stable or constant shearing is equal. The equilibrium seer stress ($T_{xy}$) is calculated from the complex viscosity $|\eta^*|$ using the following formula:

$$\tau_{xy}(\dot{\gamma}) = \omega |\eta*(\omega)| \text{ for } \omega = \dot{\gamma}$$

The normalized complex viscosity is given according to the following equations by the memory share and the loss percentage as a function of frequency (ω):

$$|\eta*(\omega)| = \frac{(G'^2 + G''^2)^{1/2}}{\omega}$$

The stress ratio (SR) is defined as:

$$SR(\dot{\gamma}) = \frac{N_1(\dot{\gamma})}{\tau_{xy}(\dot{\gamma})}$$

The dimensionless index ($R_2$) resulting from a quotient of the stress ratio and the loss tangent according to the following formula:

$$R_2 = \frac{SR(500s^{-1})\eta}{\tan S(0, 1 \text{ rad/s})} \cdot \frac{1}{248}$$

where $\eta_o$ has the Pascal seconds (Pa's) unit.

It is advisable to use polypropylene with an onset temperature ($T_{c,rheol}$) when flowing of at least 120° C., and preferably at least 123° C., and optimally of at least 131° C. It is best to determine the onset temperature using crystallization via SAOS (Small Angel Oscillatory Shear) rheology. It is practical to cool down the sample from the molten state at optimally 190° C. at a predetermined cooling rate. In the invention, the sample is melted in the form of test disks with a diameter of 25 mm and a thickness of 2.5 mm without pressure and then formed under pressure for 3 minutes. The originally 2.5 mm thick test disks are then fed into a 1.9 mm gap between two parallel plates. Optimally, thermal expansions will be considered in the performance of the measurements in order to insure a constant gap spacing throughout the entire experiment. To meet practical concerns, the test disks will first be warmed to 190° C. and tempered for 15 minutes at 190° C. in order to eliminate thermal and structural idiosyncrasies. Then, as part of the invention, starting from start temperature of 190° C., the test disks will be loaded with an expansion of 1% at a constant cooling rate of optimally 1° C./min. and an angular velocity of one rad/sec., which is an expansion within the range of the linear viscosity. A maximum torque criterion is used to end the experiment. At the beginning of the crystallization process during the rheology test, the measurement instrument goes over into an overloaded state when the maximum torque is reached in such a way that the test is broken off thermally. The crystallization can be observed through a sudden increase in the complex viscosity and a sudden drop in the loss agents, i.e. the application of complex viscosity against the temperature and the loss agents against the temperature exhibits a region with a sudden change of rheological properties with regard to which rheological properties are generated by the occurrence of crystallization. The onset temperature and/or onset crystallization temperature ($T_{c,rheol}$) is defined as the temperature at which a steep increase in the complex viscosity and a simultaneous drop in loss agents is detected.

Most practically, the polypropylene will exhibit an average, isotactic sequence length of at least 65, preferably at least 85, and optimally at least 97. The average isotactic sequence length (Average Meso Run Length, MRL) is defined by the formula MRL=10,000: $D_{total}$. Here, $D_{total}$ is the sum of the number of stereodefects (Ds) per 10,000 monomer units of the polymers and the number of defects (Dr) per 10,000 monomers of the polymer. Most practically, a tacticity of the polypropylene will be determined in order to determine the average isotactic sequence length using $^{13}C$ MCR, for example in 1,1,2,2, tetrachlorethane-D2 at a temperature of 140° C.

It is part of the invention that the filaments are generated as monocomponent filaments. Monocomponent filaments have been proven especially advantageous with regard to solving the technical problem of the invention. The invention also includes that the filaments are run under the condition that filaments with a filament diameter from 0.3 to 2 den, preferably from 0.3 to 0.9 den are retained. Most practically, the filament diameter of the filaments generated according to the invention will have a filament diameter of less than 1 den, with substantially less than 1 den being particularly preferable. The filament diameter is measured at the filaments placed at the spunbond line.

The invention is based on the recognition that spunbond of optimal homogeneity can be produced using the apparatus of the invention. Objectionable inhomogeneities such as diameter inhomogeneities at the filaments etc. can be avoided using the measures of the invention. It must also be stressed that spunbond webs of exceptional strength, particularly in the transverse direction and across the transport direction can be produced using the apparatus of the invention. In addition, filaments of surprisingly low titres can be produced with the measures of the invention when appropriate stretching conditions are set. As a whole, the apparatus and method defined by the invention are characterized by low cost and low effort. The advantages explained above are, surprisingly, particularly distinct when specially modified polypropylene is used for the manufacture of the spunbond.

BRIEF DESCRIPTION OF THE DRAWING

In the following, the invention is explained in greater detail based on a drawing illustrating only one sample design. It shows the following in schematic drawing.

SPECIFIC DESCRIPTION OF THE INVENTION

Figure 1:
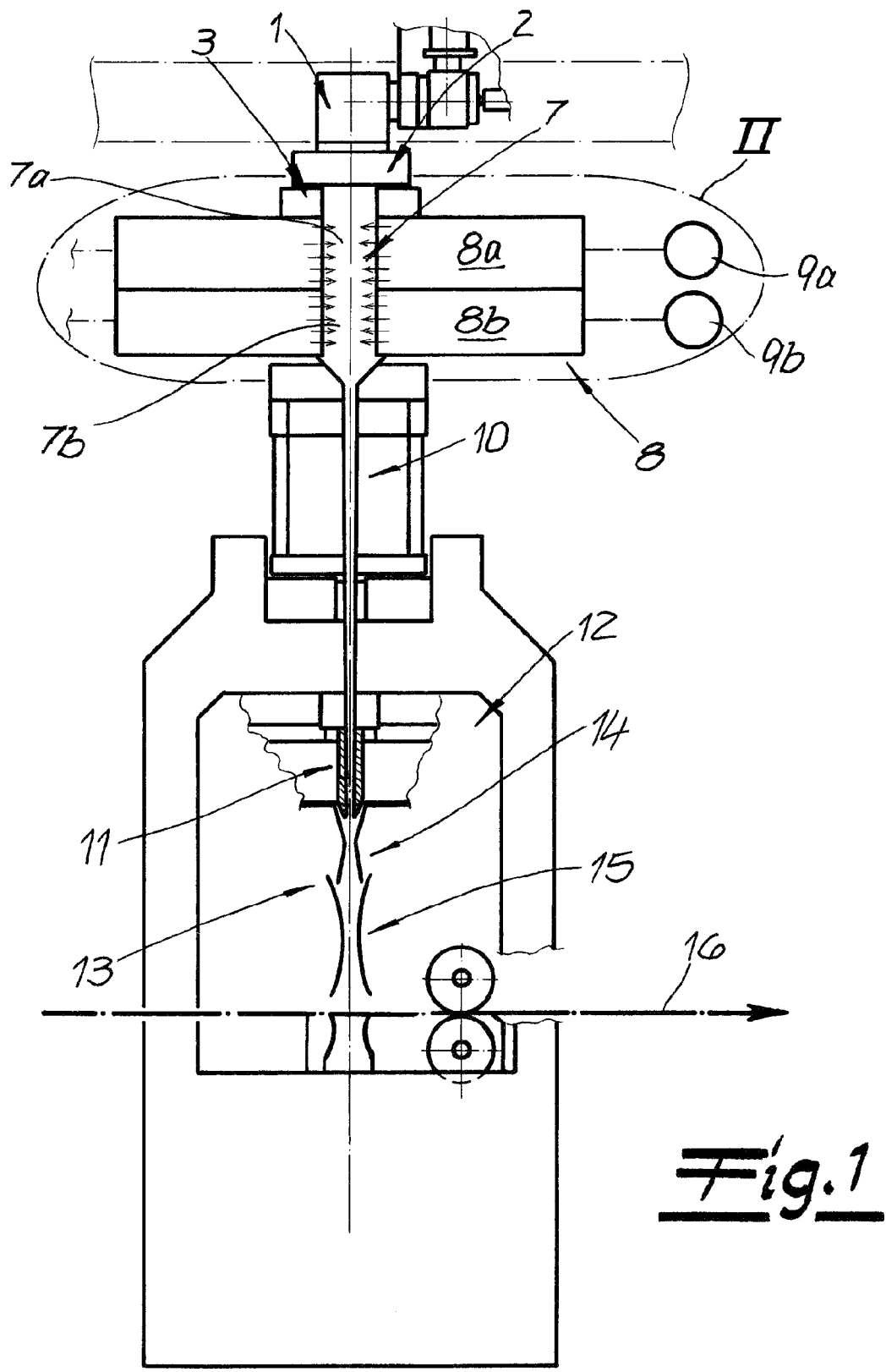
FIG. 1 a vertical section through the apparatus according to the invention.
Figure 2:
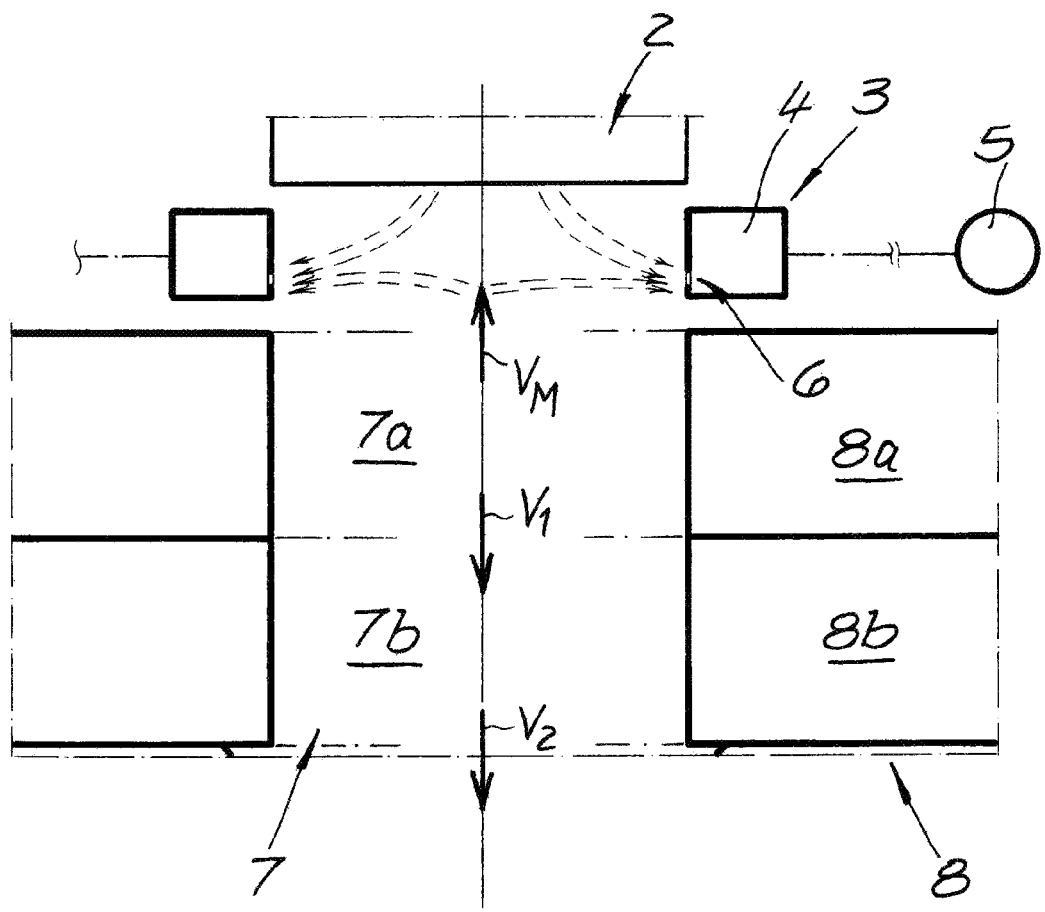
FIG. 2 an enlarged section of the detail shown at II in FIG. 1.

The figures show an apparatus for continuous production of a spunbond web of filaments of thermoplastic. The apparatus exhibits, first of all, a spinneret 1 with a nozzle plate 2 and nozzle holes therein for spinning the filaments that are not depicted. The spun filaments are then run past a monomer suction device 3 positioned below spinneret 1. This monomer suction device 3 is used to remove objectionable gasses from the system during the spinning process. The monomer suction device 3 exhibits a sucking chamber 4 as well as an exhaust ventilator 5 connected to the sucking chamber 4. A sucking slit 6 for sucking up the gasses is included in the lower region of the sucking chamber 4. Most practically, the sucking chamber 4 will be positioned both to the right and left of the filament formation space, as shown in the design example. The left half of the sucking chamber 4 is also connected to sucking ventilator 5.

A cooling chamber 7 into which process air for cooling the filaments can be introduced is positioned below the spinneret 1 and below the monomer suction device 3. Preferably, the cooling chamber 7 will be divided into an initial, upper cooling chamber 7a and a second, lower cooling chamber 7b, as shown in the design example. Most practically, and as shown in the design example, an air supply chamber 8 will be positioned next to the cooling chamber 7 that advisably and as shown in the design example, will be divided into an upper compartment 8a and a lower compartment 8b. Preferably and as shown in the design example, process air of various volumetric flow rates can be fed in from the two compartments 8a and 8b. Most practically and as shown in the design example, a blower 9a and 9b for feeding in process air will be connected to the compartments 8a and 8b. The scope of the invention includes that the infed volumetric flow rates of process air can be controlled. The scope of the invention also includes that the compartments 8a and 8b be positioned both to the right and left of the cooling chamber 7. The left halves of compartments 8a and 8b are also connected to the corresponding blowers 9a and 9b.

The invention is based on the recognition that process air can be or is sucked from the first, upper cooling compartment 7a at a volumetric flow rate $V_M$ via the monomer suction device 3 positioned above the cooling chamber 7. The process air leaves the first, upper cooling compartment 7a toward the second cooling compartment 7b at a volumetric flow rate $V_1$. According to the invention, the ratio of the volumetric flow rates $V_M/V_1$ is 0.1 0.3 and preferably 0.12 to 0.25. The process air leaves the second, lower cooling compartment 7b at a volumetric flow rate $V_2$. The flow volume ratio $V_1/V_2$ is preferably 0.1 to 0.5.

It can be seen in FIG. 1 that the cooling chamber 7 is connected to the intermediate passage 10, as shown in the design example. This intermediate passage 10 reaches to pulling under passage 11 of the stretcher 12. Most practical and as shown in FIG. 1 of the design example, the intermediate passage 10 runs together in a vertical, wedge-shaped cut from the outlet of cooling chamber 7 to the inlet of the pulling under passage 11, and preferably and as shown in the design example with the entry width of the pulling under passage 11. Preferably and as shown in the design example, a laying unit 13 is positioned below the stretcher 12. In the design example, this laying unit 13 has two diffusers 14 and 15. It can be seen that each of these diffusers 14 and 15 has a diverging shape or is designed with diverging walls in the lower area. Preferably and as shown in the design example, a continuous, moving conveyor belt 16 for depositing the filaments and/or the spunbond web is provided below the laying unit 13.

It can be seen in FIG. 1 that, with the exception of the infeed of process air to the cooling chamber 7, no air supply takes place in the area of the cooling chamber 7, the intermediate passage 10, and the laying unit 13. This means that operations are performed in a closed system. FIG. 1 also shows that the spacing between the spinneret 1 and/or between the nozzle plate 2 and the cooling chamber 7 can be set and varied according to the recommended design form. Most practical and as shown in the design example, the vertical height of spinneret 1 can be set.

We claim:

1. An apparatus for making a spunbond web of filaments, the apparatus comprising:
    a spinneret generating thermoplastic filaments in a direction,
    a cooling chamber downstream from the spinneret subdivided into upper and lower cooling compartments,
    means for introducing process air for cooling the filaments into the chamber,
    a monomer suction device between the spinneret and the cooling chamber for receiving the filaments from the spinneret and feeding the filaments to the cooling chamber,
    a stretcher downstream of the monomer suction device and receiving the filaments from the cooling chamber,
    a deposition device downstream of the stretcher for deposition of the filaments by the stretcher as the web,
    recirculating means for
        withdrawing a portion of the process air from the upper cooling compartment at a volumetric flow rate of $V_M$,
        feeding the withdrawn portion of the process air to the monomer suction device,
        feeding another portion of the process air at a volumetric flow rate $V_1$ into the lower cooling compartment such that a volumetric flow-rate ratio $V_M/V_1$ is 0.1 to 0.35, and
        withdrawing process air at a volumetric flow rate $V_2$ from the lower cooling chamber portion such that a volumetric flow rate $V_1/V_2$ is 0.1 to 0.45.

2. The apparatus according to claim 1, further comprising:
    an air supply cabin positioned next to the cooling chamber and divided into upstream and downstream cabin sections, the recirculating means introducing process air into the upper cooling compartment from the upstream cabin section and into the lower cooling compartment from the downstream cabin section.

3. The apparatus according to claim 1, wherein a distribution of nozzle holes of the spinneret is homogeneous everywhere or across the entire nozzle plate of the spinneret.

4. The apparatus according to claim 1, wherein a spacing between the spinneret and the cooling chamber can be varied.

5. The apparatus according to claim 1, wherein air from outside is blocked from entry into the cooling chamber and at the transition area between the cooling chamber and the stretcher.

6. The apparatus according to claim 1, further comprising: a diffuser between the stretcher and the deposition unit.

7. An apparatus for making a spunbond web, the apparatus comprising:
  means for supplying polypropylene having an average isotactic sequence length of at least 65 and an onset temperature of at least 120°;
  a spinneret having a nozzle plate forming a plurality of nozzle holes homogeneously distributed across the entire nozzle plate and connected to the means for heating for receiving the heated polypropylene and extruding filaments of the heated polypropylene through the homogeneously distributed nozzle holes such that the filaments travel in a flow direction and are spaced apart homogeneously in a direction transverse to the flow direction;
  a monomer suction device downstream of the spinneret and through which the homogeneously spaced and extruded filaments move in the flow direction;
  a cooling chamber downstream of the monomer suction device and divided into upper and lower cooling compartments through which the filaments move in the direction after exiting the monomer suction device;
  blower means for
    feeding cool process air into the cooling chamber to cool the filaments in the compartments thereof,
    sucking a portion from the upper cooling compartment and into the monomer suction device at a volumetric flow rate $V_M$,
    feeding another portion of the process air from the upper compartment at a volumetric flow rate $V_1$ into the lower cooling compartment,
    withdrawing process air from the lower cooling compartment at a volumetric flow rate $V_2$;
  control means connected to the blower means for setting the flow rates relative to each other such that a volumetric flow-rate ratio $V_M/V_1$ is 0.1 to 0.3 and a volumetric flow-rate ratio $V_1/V_2$ is 0.1 to 0.45;
  a stretcher downstream of the lower cooling compartment for receiving and stretching the filaments therefrom; and
  a deposition device downstream of the stretcher for receiving the stretched filaments.

* * * * *